US008747227B2

(12) United States Patent
Steene et al.

(10) Patent No.: US 8,747,227 B2

(45) Date of Patent: Jun. 10, 2014

(54) METHOD AND SYSTEM FOR CONTROLLING GAMES OF COMBINED SKILL AND CHANCE

(75) Inventors: Johan Steene, Stockholm (SE); Jonas Haggqvist, Stockholm (SE); Jan Bohult, Hasselby (SE)

(73) Assignee: ACEI AB (SE)

( * ) Notice: Subject to any disclaimer, the term of this patent is extended or adjusted under 35 U.S.C. 154(b) by 1562 days.

(21) Appl. No.: 11/719,123

(22) PCT Filed: Nov. 14, 2005
(Under 37 CFR 1.47)

(86) PCT No.: PCT/SE2005/001715
§ 371 (c)(1),
(2), (4) Date: Jul. 6, 2009

(87) PCT Pub. No.: WO2006/052211
PCT Pub. Date: May 18, 2006

(65) Prior Publication Data

US 2011/0039621 A1 Feb. 17, 2011

Related U.S. Application Data

(60) Provisional application No. 60/522,844, filed on Nov. 12, 2004.

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .................. 463/42; 463/13; 463/16; 463/20; 463/25

(58) Field of Classification Search
USPC .................................... 463/13, 16, 20, 25, 42
See application file for complete search history.

(56) References Cited

U.S. PATENT DOCUMENTS

| | | | | |
|---|---|---|---|---|
| 5,342,049 | A * | 8/1994 | Wichinsky et al. | 273/119 R |
| 5,700,008 | A | 12/1997 | Lawlor et al. | |
| 5,741,011 | A | 4/1998 | So et al. | |
| 5,961,384 | A | 10/1999 | Robinson | |
| 6,712,693 | B1 * | 3/2004 | Hettinger | 463/20 |
| 6,764,397 | B1 * | 7/2004 | Robb | 463/23 |
| 2003/0125107 | A1 * | 7/2003 | Cannon | 463/25 |
| 2003/0171144 | A1 * | 9/2003 | Letovsky | 463/16 |

* cited by examiner

*Primary Examiner* — Adetokunbo O Torimiro

(74) *Attorney, Agent, or Firm* — McAndrews, Held & Malloy, Ltd.

(57) ABSTRACT

A computer based gaming system for operating a game of combined skill and chance, comprising a gaming machine configured to operate a game of skill and chance; a gaming server communicatively coupled to the gaming machine; a skill/chance game control configured to control the relation between a skill element and a chance element of said game dependent on predetermined rules.

15 Claims, 2 Drawing Sheets

METHOD AND SYSTEM FOR CONTROLLING GAMES OF COMBINED SKILL AND CHANCE

TECHNICAL FIELD

The present invention relates in general to a computerized gaming device operating a game of combined skill and chance, and more particularly to controlling the relation between skill and chance elements in such a game.

BACKGROUND

Basically, games of chance involving wagering and winning money and skill games have for a long time belonged to different worlds with regard to players as well as to game providers. From the player's point of view, a game of chance traditionally has its main attraction in the excitement of having the chance to win money and in some games, for example poker, also an attraction in the pursuit of a strategy in order to try to increase the chance of winning. In skill games the main attraction is instead the entertainment of playing a game and affecting the outcome by means of personal skill, and also to experience progress when personal skill increases.

Games of chance are in most countries also subject to more or less restricting regulations from the authorities. This fact in its turn has entailed that games of chance to a large extent are developed and operated by specialized gaming providers, whereas skill games flourish freely on the market and appears in a large variety of media and environments. There are nowadays a huge number of people who are regularly engaged in playing skill based entertainment games.

In recent years developed technology as well as the emergence of less regulated markets for wagering games, have brought the different worlds closer together and the traditional gaming industry is seeking ways of combining games of skill and chance. For commercial reasons the gaming industry seeks to attract a broader range of players also including those players that are engaged in entertainment games.

PRIOR ART

Examples of prior art employing games of combined skill and chance are found in the following patent publications, which for the sake of enablement of per se known parts of the invention are incorporated by reference in this specification.

U.S. Pat. No. 6,780,103 discloses a gaming device having skill/perceived skill bonus round.

U.S. Pat. No. 5,700,008 discloses an amusement device integrating games of skill and chance.

EP0958011 discloses a sports game of skill and chance.

EP1253563 discloses an amusement game having a probability-based award system.

US20020043763 discloses a game of chance and skill, method of play, game components and game board.

US20020163130 discloses a skill and chance game for fun or competition.

US20030171144 discloses a video game of chance apparatus.

U.S. Pat. No. 5,342,049 discloses a gaming machine with skill feature.

U.S. Pat. No. 5,741,011 discloses a method of playing a game of skill and chance.

U.S. Pat. No. 5,931,470 discloses a board game using proportional paths.

U.S. Pat. No. 5,961,384 discloses a method for playing a game of chance and skill.

U.S. Pat. No. 6,152,447 discloses an amusement machine including a game of chance in combination with a crane game operable in response to a win on the game of chance.

U.S. Pat. No. 6,572,473 discloses a gaming device having game scheme allowing player skill to affect symbol movement without affecting award.

U.S. Pat. No. 6,764,397 discloses a method and apparatus for casino machine gaming system.

U.S. Pat. No. 6,808,174 discloses a card game.

WO03006128 discloses a system and method for adding a skill aspect to games of chance.

WO9746988 discloses an amusement machine.

OBJECT OF THE INVENTION

It is an object of the present invention to provide a method and system for controlling games of combined skill and chance in a computer based gaming system.

The inventive concept is explained by means of exemplifying embodiments and in conjunction with the accompanying drawings, in which.

DESCRIPTION OF EMBODIMENTS OF THE INVENTION

Figure 1:
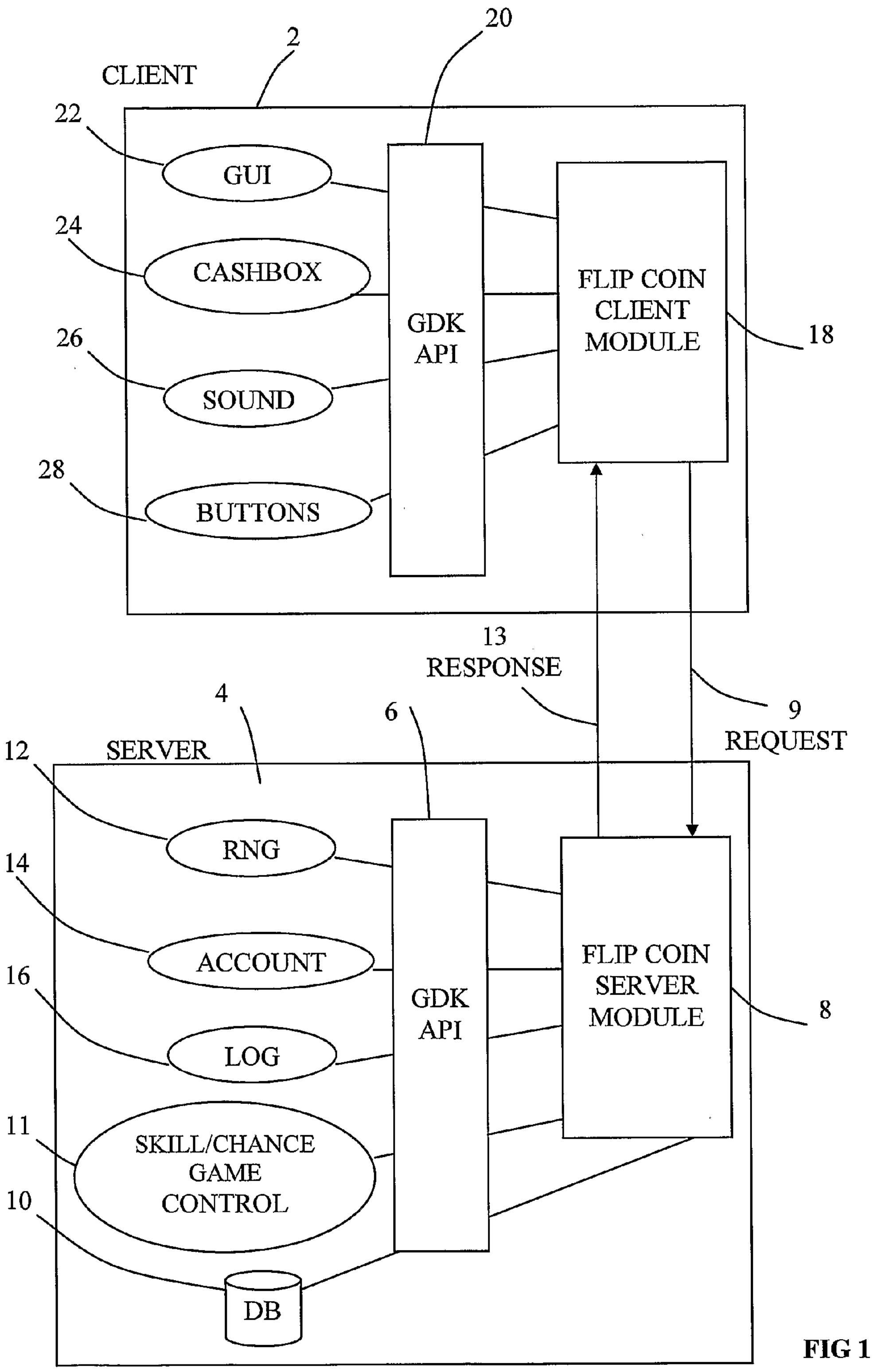
FIG. 1 shows a schematic outline of a client-server based gaming system with a skill/chance game control according to an embodiment of the invention.

The object is achieved by providing a game control for controlling the relation between skill and chance elements in games of combined skill and chance, in the shape of a method, an apparatus and a computer program product. The skill/chance game control is devised to control the skill/chance relation according to a number of different aspects dependent on predetermined rules.

In a first embodiment of the invention, the skill/chance game control is devised to control a game that has a chance based determined outcome of win or lose irrespective of the skill of the player playing the game. The skill/chance game control operates to simulate, manipulate or correcting the consequence of a player input in the skill based part of the game in accordance to predetermined rules in order to end up in the predetermined outcome. In an exemplifying embodiment this is performed in accordance with the following steps:

1. The player places a bet.
2. The game is started.
3. A chance based outcome win or lose of the game is determined by means of a random number generator in the central server.
4. The game of skill is presented to the player.
5. The player provides a player input in specific game situations and at specific points in time, and receives a response from the game.
6. If the player makes the correct input in the game of skill according to predetermined rules or thresholds, and the determined chance based outcome is win, then a game of chance, for example a wheel of fortune or spinning reels, is started and winning outcome is presented.
7. If the player makes the correct input in the game of skill, and the determined chance based outcome is lose, a game of chance is started and losing outcome is presented.

8. If the player makes incorrect input in the game of skill, and the determined chance based outcome is win, then the game of skill is manipulated in order to make the player input correct or be perceived to be correct, a game of chance is started and winning outcome is presented. For example, the effect of the player input may be manipulated to give a correct result or the required skill level is adjusted. Another alternative is to allow the player to play a new game until correct input is achieved and the win outcome is motivated from skill point of view.
9. If the player makes incorrect input in the game of skill, and the determined chance based outcome is lose, then present a losing outcome of the game of skill.

In another embodiment of the invention, the skill/chance game control is devised to control when, in relation to a skill element, a chance element is to be performed. For example, the chance element can be devised to occur before the skill element as in the above described embodiment, after a skill element or dependent on a truly skill based achievement of a predetermined result in the skill game. Another controllable parameter is the number of games of chance that are achievable in a round of a game of skill.

In an embodiment of the invention, the skill/chance game control is devised to control the win payout percentage of the wager relating to chance elements and skill elements, respectively. For games of chance there are often requirements of a payout percentage of about 90-98% of the total wager, whereas typical entertainment games of skill have a payout percentage of 0%. In the latter case only time for playing is purchased. The invention enables a combination or differentiation of the payout percentage such that a certain first payout percentage relates to the game of skill, i.e. a payout for skill based achievements in the game, and a certain second payout percentage relates to the game of chance. The first and the second payout percentage may be complementary such that a total required payout percentage is achieved.

In another embodiment the skill/chance game control is devised to control the game such that each game of skill after termination is followed by a game of chance irrespective of the outcome of the game of skill. This variety stimulates the player in the skill element and renders a feeling of being close to a win outcome.

According to an aspect of the invention, the skill/chance game control is preferably implemented in a gaming system in a client-server based architecture, with a client gaming machine and a gaming server. In preferred embodiments of the invention, the game control is realised for a game that is implemented by means of a gaming application program comprising a game specific client module and game specific functions in a client gaming machine and a game specific server module in a gaming server being provided with general gaming functions. In one embodiment the skill/chance game control is implemented as a general gaming function that is called by the game specific server module upon request by the game specific client module.

Other configurations of the skill/chance game control are conceivable. For example, the skill/chance game control can be configured as a separate entity in the server, and be devised to monitor and communicate control parameters in the gaming applications.

FIG. 1 shows schematically a client and server based computerised gaming system with a gaming machine 2, also called a video lottery terminal, set up as a client and a gaming server 4 that is communicatively coupled to the client gaming machine 2. The gaming machine 2 and the server are provided with data processors, memory means, data communications interfaces, control programs, user input/output interfaces etc. in a per se well known manner. In the example of FIG. 1 there is only a single client gaming machine but of course a number of client gaming machines can be and is normally connected to a server.

The server 4 is provided with a gaming application program interface enabling communication between a server module 6 of a specific gaming application program and general gaming functions 10,11,12,14,16 installed on the server. The general gaming functions are provided to be available for any specific gaming application program independently of the specific gaming content. These general gaming functions are typically critical functions such as a database 10, a random number generator 12, an account service function 14, a log service function 16, or other functions that beneficially are shared by different specific gaming application programs.

The client gaming machine 2 is also provided with a gaming application program interface 20 enabling communication between a client module 18 of the specific gaming application program and gaming specific functions 22,24,26,28 installed on the client gaming machine 2. The gaming specific functions are designed for implementing a specific game on the client gaming machine 2 and are available for the gaming specific client module 18. These game specific functions are typically a graphical user interface GUI 22, a cashbox function 24, a sound function 26 and user input interface function, for example buttons, 28, and other functions that are related to the content and presentation of the game. The gaming specific client module 18 is communicatively coupled to the corresponding gaming specific server module 8 for communicating requests 9 and responses 13 in order to utilize the general gaming functions. For each game a message protocol for communication between the client module and the server module is generated, the protocol is for example based on XML and is shared by the client and the server.

A specific gaming application program in accordance with the invention thus comprises a server module 8, a client module 18 and a selection of gaming specific functions 22,24,26, 28. Whereas general functions commonly used by different gaming applications are provided and available centrally in the server.

Figure 2:
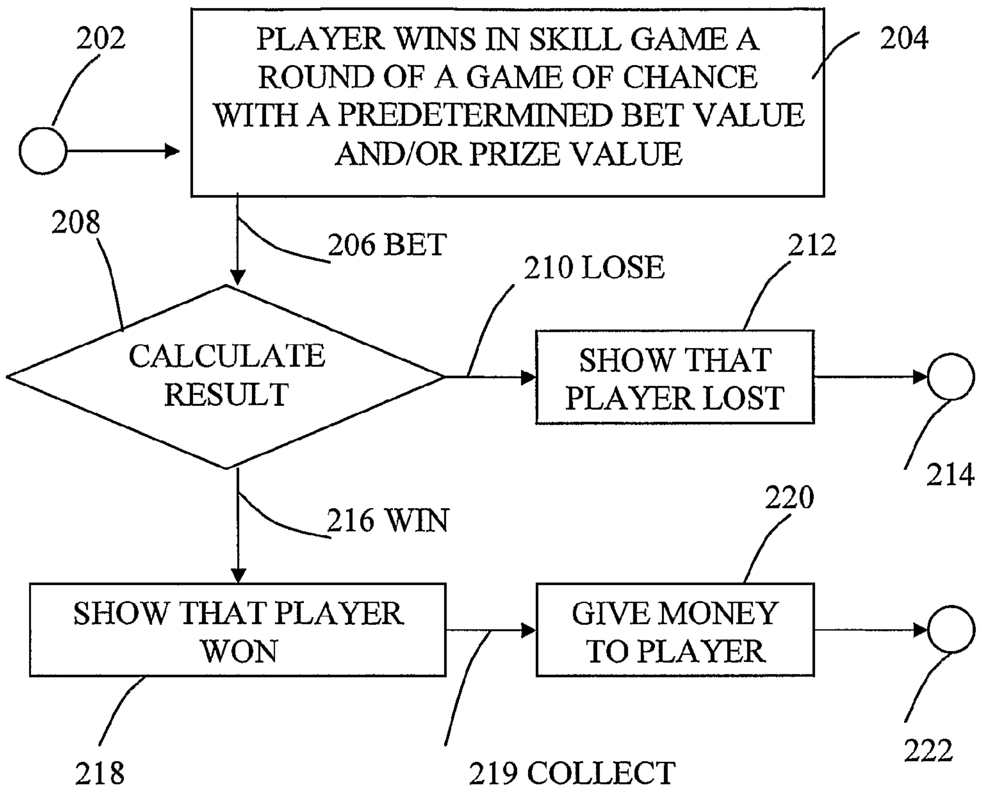
FIG. 2 shows a flow chart of a simple example of a gaming application.

FIG. 2 shows schematically a simple example of a portion of a gaming application in accordance with an embodiment of the invention as described in connection with FIG. 1, for example a pinball game of skill in which a predetermined input results in the winning of a game of chance such as a spinning reels game with a predetermined bet value. The game is run by executing the client module 18 and the client specific functions of the pin ball game application in a client gaming machine in step 202. In step 204 the player wins in the skill game a round of chance with a predetermined bet value and is presented a display of the game of chance and the predetermined bet value or prize value for that game. The bet 206 is communicated and a result of the game of chance is calculated in 208. Step 208 involves the client module 18 sending a request to the server module 8 to generate an outcome of the game of chance for that level of bet value or prize value. The server module in its turn calls the random number generator 12 and receives a random number in return. The server module calculates an outcome according to predetermined rules for the game and bet value/prize value, and dependent on the returned random number. Thereafter, a response with the outcome Win or Lose is communicated back to the client module. If the outcome is Lose 210 the player is presented a message showing that player lost 212, and the game of chance is ended in 214. If, on the other hand the outcome is Win 216 the player is presented a message showing that the player won a prize 218. A request to Collect 219 the prize is generated, and the prize usually in the form of cash or credit money, is paid to the player and the game of chance ends in 222. Thereupon the game may resume to a new or continued game of skill. The payout of a prize again preferably involves requesting services from the server module and for example utilizing the general gaming functions account function 16 and database function 10.

The invention claimed is:

1. A computer based gaming system for operating a game of skill and a game of chance, the gaming system comprising:

a gaming machine configured to facilitate a play of the game of skill and a play of the game of chance;

a gaming server communicatively coupled to the gaming machine; and a game control arranged to control an operation of the game of skill and the game of chance based on a predefined set of rules, wherein the rules comprise:

if a player input during the play of the game of skill is incorrect and a predetermined outcome for the game of chance is a winning outcome, manipulating the game of skill such that the player input is correct.

2. The gaming system of claim 1, wherein the game control is configured to control when, in relation to a skill element, a chance element is to be performed.

3. The gaming system of claim 1, wherein the game control is configured to control a win payout percentage of a wager relating to chance elements and skill elements, respectively.

4. The gaming system of claim 1, wherein the game control is configured to control the operation of the game such that each game of skill after termination is followed by a game of chance irrespective of the outcome of the game of skill.

5. The gaming system of claim 1, wherein the gaming system is configured in a client/server structure comprising:

a server module of a specific gaming application program provided in the server;

a general gaming function provided in the server;

a gaming application program interface provided in the server and enabling communication between the server module of said specific gaming application program and said general gaming function;

a client module of said specific gaming application program provided in a client gaming machine;

a gaming specific program function provided in the gaming machine and being executable in response to a call from said client module; and a gaming application program interface provided in the gaming machine and enabling communication between the client module of said specific gaming application program and said gaming specific program function.

6. The gaming system of claim 5, wherein the game control comprises a general gaming function.

7. A method for controlling a game of skill and a game of chance, the method comprising:

allowing a player to place a bet at a gaming machine;

providing a game of skill and a game of chance to the player, said game of skill including a skill element responsive to player input, and a chance element corresponding to a random event; and controlling a relation between said skill element of said game of skill and said chance element of said game of chance based on predetermined rules, wherein the rules comprise:

if a player input during play of the game of skill is incorrect and a predetermined outcome for the game of chance is a winning outcome, manipulating the game of skill such that the player input is correct.

8. The method of claim 7, further comprising controlling when, in relation to a skill element, a chance element is to be performed.

9. The method of claim 7, further comprising controlling a win payout percentage of a wager relating to chance elements and skill elements, respectively.

10. The method of claim 7, wherein each game of skill, after termination, is followed by the game of chance irrespective of the outcome of the game of skill.

11. The method of claim 7, further comprising controlling a game that has a chance based determined outcome of win or lose to end in said determined outcome irrespective of actual skill of the player playing the game.

12. The method of claim 7, wherein further comprising controlling when, in relation to a skill element, a chance element is to be performed.

13. The method of claim 7, further comprising controlling a win payout percentage of a bet relating to chance elements and skill elements, respectively.

14. The method of claim 7, further comprising controlling the game such that each game of skill, after termination, is followed by a game of chance irrespective of the outcome of the game of skill.

15. The method of claim 7, further comprising providing the game in a client/server structure.

* * * * *